(12) United States Patent
Gondaira (10) Patent No.: US 11,372,222 B2
(45) Date of Patent: Jun. 28, 2022

(54) CONFOCAL MICROSCOPE AND METHOD FOR TAKING IMAGE USING THE SAME

(71) Applicant: LASERTEC CORPORATION, Kanagawa (JP)

(72) Inventor: Ko Gondaira, Kanagawa (JP)

(73) Assignee: Lasertec Corporation, Kanagawa (JP)

( * ) Notice: Subject to any disclaimer, the term of this patent is extended or adjusted under 35 U.S.C. 154(b) by 291 days.

(21) Appl. No.: 16/722,823

(22) Filed: Dec. 20, 2019

(65) Prior Publication Data

US 2020/0201011 A1 Jun. 25, 2020

(30) Foreign Application Priority Data

Dec. 25, 2018 (JP) .............................. JP2018-241038

(51) Int. Cl.
*G02B 21/00* (2006.01)

(52) U.S. Cl.
CPC ....... *G02B 21/0032* (2013.01); *G02B 21/008* (2013.01); *G02B 21/0044* (2013.01); *G02B 21/0048* (2013.01); *G02B 21/0076* (2013.01)

(58) Field of Classification Search
None
See application file for complete search history.

(56) References Cited

U.S. PATENT DOCUMENTS

| 6,674,572 B1 * | 1/2004 | Scheruebl .......... G02B 21/0024 |
| | | 356/392 |
| 2018/0164563 A1 | 6/2018 | Fujii et al. |
| 2019/0310454 A1 * | 10/2019 | Shimada ................ G02B 21/02 |
| 2020/0041251 A1 * | 2/2020 | Gondaira ................ H01L 21/64 |

FOREIGN PATENT DOCUMENTS

| JP | 2006039048 | 2/2006 |
| JP | 2018-066967 | 4/2018 |
| JP | 2018-096760 | 6/2018 |
| JP | 2018-120057 | 8/2018 |

OTHER PUBLICATIONS

Office Action dated Jul. 23, 2019 for corresponding JP Patent Application No. 2018 241038, and English Translation.

* cited by examiner

*Primary Examiner* — Derek S. Chapel
(74) *Attorney, Agent, or Firm* — Renner, Otto, Boisselle & Sklar, LLP (57) ABSTRACT

A confocal microscope includes a data acquisition unit configured to acquire a rough-shape data indicating a rough shape of a sample, an illumination light source configured to generate illumination light for illuminating the sample, an objective lens configured to concentrate the illumination light on the sample, an optical scanner configured to scan an illuminated place on the sample in a field of view of the objective lens, a stage configured to scan the illuminated place along the rough shape of the sample by changing a position of the objective lens relative to the sample, and an optical detector configured to detect reflected light through a confocal optical system, the reflected light being light that has been reflected on the sample and has passed through the objective lens.

12 Claims, 6 Drawing Sheets

CONFOCAL MICROSCOPE AND METHOD FOR TAKING IMAGE USING THE SAME

CROSS REFERENCE TO RELATED APPLICATIONS

This application is based upon and claims the benefit of priority from Japanese patent application No. 2018-241038, filed on Dec. 25, 2018, the disclosure of which is incorporated herein in its entirety by reference.

BACKGROUND

The present disclosure relates to a confocal microscope and a method for taking an image using the same.

Japanese Unexamined Patent Application Publication No. 2006-39048 discloses a microscope apparatus using a confocal optical system. The microscope apparatus disclosed in Japanese Unexamined Patent Application Publication No. 2006-39048 includes a first optical system that acquires an image in a high resolution, and a second optical system that acquires an image in a low resolution. The microscope apparatus includes a Z-moving mechanism for moving an objective lens and a stage relative to each other in an optical-axis direction. The microscope apparatus generates a three-dimensional (3D) composite image based on Z-coordinate data. Further, the microscope apparatus includes an XY-moving stage, and connects and combines a plurality of observation images in a two-dimensional (2D) manner based on XY-coordinate data of the XY-moving stage.

SUMMARY

A confocal microscope can acquire a 3D shape of an object by three-dimensionally scanning (i.e., continuously or successively moving) the position of a focal point. Illumination light is scanned (i.e., continuously or successively moved) by moving the objective lens or the stage along the direction of the optical-axis and using a galvanometer mirror or the like. Specifically, the stage is moved along the direction of the optical-axis in a stepwise manner and the illumination light is two-dimensionally scanned by using the galvanometer mirror in each layer. In this way, it is possible to measure a 3D shape of the object.

When an objective lens having a high magnification is used, the field of view of the objective lens becomes narrow. Therefore, there is a problem that when a 3D confocal image of a large area is taken, the time taken for taking the image increases. Further, when an image of an area larger than the field of view is taken, it is necessary to compensate for shading and distortion in the optical system.

The present disclosure has been made in view of the above-described circumstances and provides a confocal microscope and a method for taking an image, capable of taking a high-precision confocal image in a short time.

A first exemplary aspect is a confocal microscope including: data acquisition means for acquiring a rough-shape data indicating a rough shape of a sample; an illumination light source configured to generate illumination light for illuminating the sample; a first objective lens configured to concentrate the illumination light on the sample; an optical scanner configured to scan an illuminated place on the sample in a field of view of the first objective lens; a scanning mechanism configured to scan the illuminated place along the rough shape of the sample by changing a position of the first objective lens relative to the sample; and an optical detector configured to detect reflected light through a confocal optical system, the reflected light being light that has been reflected on the sample and has passed through the first objective lens.

In the above-described confocal microscope, the first objective lens may be disposed so that an optical axis of the first objective lens is inclined from an upper surface of the sample.

In the above-described confocal microscope, the data acquisition unit may acquire a rough-shape data indicating a rough shape of an edge part of the sample. The illumination light may illuminate the edge part of the sample. The first objective lens may concentrate the illumination light on the edge part. The scanning mechanism may scan the illuminated place along the rough shape of the edge part of the sample by changing the position of the first objective lens relative to the sample in a direction inclined from the optical axis.

In the above-described confocal microscope, a direction of the scanning performed by the scanning mechanism may have a component parallel to a direction of the scanning performed by the optical scanner.

In the above-described confocal microscope, the scanning mechanism may continuously scan the illuminated place along the rough shape of the sample.

In the above-described confocal microscope, the sample may be a semiconductor wafer with a notch part formed therein, and the rough-shape data may indicate a rough shape of the notch part of the semiconductor wafer. Further, the confocal microscope may take an image of the notch part of the semiconductor wafer.

In the above-described confocal microscope, the rough data may be acquired by using a second objective lens having a magnification lower than that of the first objective lens, the second objective lens being configured so that the notch part can be observed in one field of view.

In the above-described confocal microscope, the scanning mechanism may include a movable stage on which the sample is placed.

Another exemplary aspect is a method for taking an image by using a confocal microscope configured to concentrate illumination light on a sample by using a first objective lens and detect reflected light reflected on the sample through a confocal optical system, the method including: acquiring a rough-shape data indicating a rough shape of the sample; scanning, by a scanning mechanism, an illuminated place along the rough shape of the sample by changing a position of the first objective lens relative to the sample, and scanning, by an optical scanner, the illuminated place within a field of view of the first objective lens; detecting, by a detector, the reflected light reflected on the sample during the scanning by the scanning mechanism and the optical scanner; and generating a confocal image based on detection data detected by the detector.

In the above-described method for taking an image, the first objective lens may be disposed so that an optical axis of the first objective lens is inclined from an upper surface of the sample.

In the above-described method for taking an image, the rough-shape data may indicates a rough-shape of an edge part of the sample. The illumination light may illuminate the edge part of the sample. The first objective lens may concentrate the illumination light on the edge part. The scanning mechanism may scan the illuminated place along the rough shape of the edge part of the sample by changing the position of the first objective lens relative to the sample in a direction inclined from the optical axis.

In the above-described method for taking an image, a direction of the scanning performed by the scanning mechanism may have a component parallel to a direction of the scanning performed by the optical scanner.

In the above-described method for taking an image, the scanning mechanism may continuously scan the illuminated place along the rough shape of the sample.

In the above-described method for taking an image, the sample may be a semiconductor wafer with a notch part formed therein, and the rough-shape data may indicate a rough shape of the notch part of the semiconductor wafer. Further, the confocal microscope may take an image of the notch part of the semiconductor wafer.

In the above-described method for taking an image, the rough data may be acquired by using a second objective lens having a magnification lower than that of the first objective lens, the second objective lens being configured so that the notch part can be observed in one field of view.

In the above-described method for taking an image, the scanning mechanism may include a movable stage on which the sample is placed.

According to the present disclosure, it is possible to provide a confocal microscope and a method for taking an image, capable of taking a high-precision confocal image in a short time.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Examples of embodiments according to the present disclosure will be described hereinafter with reference to the drawings. The following explanation is given for showing preferable embodiments according to the present disclosure and the technical scope of the present disclosure is not limited to the below-shown embodiments. The same symbols are assigned to the same or corresponding components throughout the drawings and duplicated explanations are omitted as appropriate for clarifying the explanation.

Figure 1:
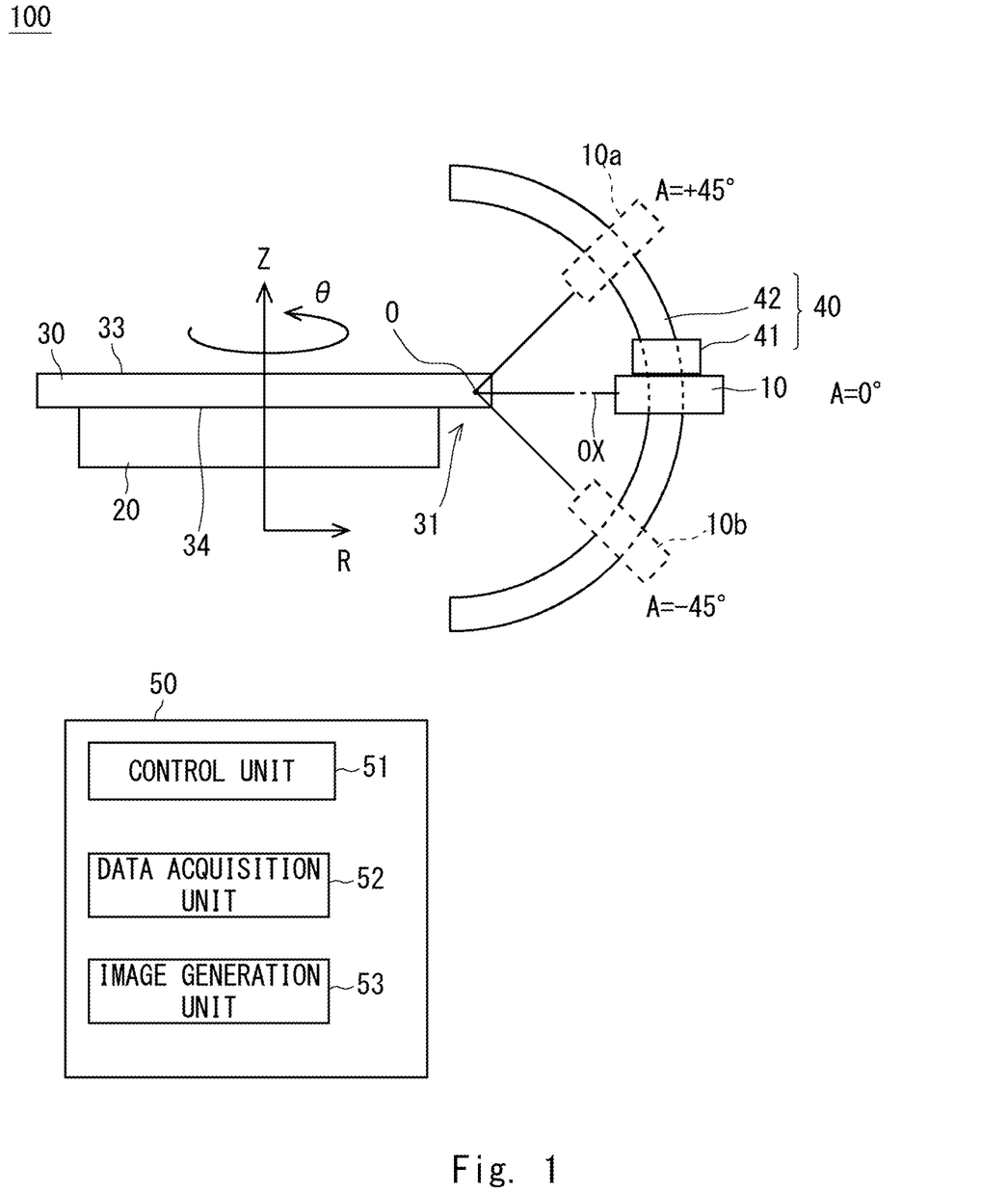
FIG. 1 is a schematic diagram showing an overall configuration of a confocal microscope according to an embodiment.

An embodiment according to the present disclosure is explained hereinafter with reference to the drawing. A configuration of a confocal microscope 100 according to this embodiment is explained with reference to FIG. 1. FIG. 1 schematically shows an overall configuration of a confocal microscope 100. A confocal microscope 100 takes a confocal image of an edge part 31 of a substrate 30. The confocal microscope 100 includes an optical head 10, a stage 20, a moving mechanism 40, and a processing unit 50. Note that in the following explanation, a vertically upward direction is referred to as a Z-axis positive direction. Further, it is assumed that the Z-direction is parallel to a thickness direction of the substrate 30. Further, a radial direction of the circular substrate 30 is referred to as an R-direction.

The substrate 30, which is an object to be measured, is placed on the stage 20. The substrate 30 is, for example, a circular substrate such as a semiconductor wafer. Note that the substrate 30 may have a notch(es) and an orientation flat(s). The confocal microscope according to this embodiment may be suitably used to take an image of a notch part. The stage 20 may hold the substrate 30 by means of a vacuum chuck or the like. The edge part 31 of the substrate 30 projects from the stage 20. That is, the stage 20 has a disk-like shape having a diameter smaller than that of the substrate 30. Note that a surface on the Z-axis positive side of the substrate 30 is referred to as a front surface 33 and a surface on the Z-axis negative side of the substrate 30 is referred to as a rear surface 34. The front and rear surfaces 33 and 34 of the substrate 30 are surfaces perpendicular to the Z-direction. The front surface 33 of the substrate 30 is a pattern-formed surface on which a pattern is formed.

The stage 20 is a scanning mechanism for scanning the substrate 30 along the rough shape of the substrate 30. For example, the stage 20 is a movable stage including a servo motor or the like that can drive the stage 20 in an R-direction and a θ-direction. It is possible to illuminate an arbitrary place on the substrate 30 by driving the stage 20 in the R-direction and the θ-direction. Specifically, the stage 20 is a rotatable stage and includes a motor that rotates the substrate 30 around the Z-axis. That is, the substrate 30 is rotated in the θ-direction. The Z-axis, which coincides with the rotational axis of the stage 20, passes through the center of the substrate 30 and is parallel to the vertical direction. The rotational angle of the stage 20 around the Z-axis is referred to as a θ-angle. Further, the stage 20 includes a linear motor or the like for moving the substrate 30 in a straight line along the R-direction.

The position in the R-direction and the θ-angle are collectively referred to as coordinate data of the stage 20. The coordinate data indicates the illuminated place on the substrate 30. Note that although the stage 20 is a rotatable stage in the example, it may be a movable stage that can be driven in orthogonal directions on the horizontal plane.

An optical system for taking an image of the edge part 31 is provided in the optical head 10. Specifically, the optical head 10 includes a line confocal optical system. The line confocal optical system includes a light source, a lens, a mirror, an optical scanner, an objective lens, a sensor, and so on. The optical system provided in the optical head 10 will be described later. The optical axis of the optical head 10 is referred to as an optical axis OX.

The optical head 10 is attached to the moving mechanism 40. That is, the moving mechanism 40 supports the optical head 10 so that the optical head 10 can be moved. The moving mechanism 40 moves the optical head 10 along a circular arc. Note that the center of the circular arc is referred to as a center O. The moving mechanism 40 includes a driving mechanism 41 and a guide 42. The guide 42 has a semi-circular arc shape. The center O of the circular arc of the guide 42 is positioned at the edge part 31 of the substrate 30. Therefore, one of the ends of the guide 42 is disposed above the substrate 30 (on the Z-axis positive side) and the other end is disposed below the substrate 30 (on the Z-axis negative side).

The driving mechanism 41 includes an actuator like a servo motor for driving the optical head 10. The optical head 10 is driven by the driving mechanism 41 and thereby is moved along the guide 42. That is, the optical head 10 rotationally moves. In this way, the inclination of the optical axis OX of the optical head 10 is changed. The rotational axis of the rotational movement of the optical head 10 is referred to as an A-axis. The A-axis passes through, for example, the center O located inside the substrate 30 and is parallel to the direction perpendicular to the drawing surface (i.e., the surface of the paper). That is, the A-axis is perpendicular to the plane that includes the Z-axis and the optical axis OX, and passes through the inside of the substrate 30. By providing the moving mechanism 40 for moving the optical head 10 along the A-axis, it is possible to take a confocal image from a desired direction.

For example, it is possible to take an image of the edge part 31 from a position obliquely above the edge part 31 by positioning the optical head 10 at a position indicated by the optical head 10a. Alternatively, it is possible to take an image of the edge part 31 from a position obliquely below the edge part 31 (from a position indicated by the optical head 10b) by positioning the optical head 10 at a position indicated by the optical head 10b. In this case, the optical axis OX is inclined from the Z-direction and the R-direction.

The processing unit 50 is, for example, a computer including a processor, a memory, and so on, and performs a process for taking an image of the edge part 31. Further, the processing unit 50 includes a monitor for displaying a measurement result and an input device such as a keyboard, a mouse, a touch panel, and the like.

The processing device 50 includes a control unit 51, a data acquisition unit 52, and an image generation unit 53. The control unit 51 controls the driving mechanism 41 and the stage 20. For example, the control unit 51 controls the driving mechanism 41 so that the A-axis is oriented obliquely upward (the position indicated by the optical head 10b). Note that the optical axis OX is inclined from the Z-direction, which is perpendicular to the surface 33. The angle of the A-axis is unchanged during the image-taking process.

The data acquisition unit 52 acquires rough-shape data indicating a rough shape of the substrate 30. The acquisition of the rough-shape data will be described later. The control unit 51 controls the stage 20 based on the rough-shape data. The control unit 51 controls the R-position and the θ-angle of the stage 20 so that the substrate 30 moves along the rough shape. The stage 20 scans (i.e., moves) the illuminated place along the rough shape. As the position of the objective lens relative to the substrate 30 changes, the illuminated place moves along the rough shape of the substrate 30. That is, the field of view of the objective lens disposed in the optical head 10 is scanned (i.e., continuously or successively moved) along the rough shape of the substrate 30. Note that the data acquisition unit 52 continuously transfers (i.e., moves) the stage 20. Consequently, the stage 20 continuously scans (i.e., continuously moves) the illuminated place.

The image generation unit 53 collects detection data corresponding to an amount of detected light detected by the optical head 10. The image generation unit 53 stores the detection data and coordinate data (the R-position and the θ-angle) while associating them to each other in a memory or the like. The image generation unit 53 generates a confocal image based on the detection data and the coordinate data. The image generation unit 53 generates a confocal image by mapping the detection data based on the coordinate data. Since the optical head 10 is equipped with the confocal optical system, it is possible to acquire a 3D brightness distribution of the reflected light. The process performed by the processing device 50 will be described later.

Figure 2:
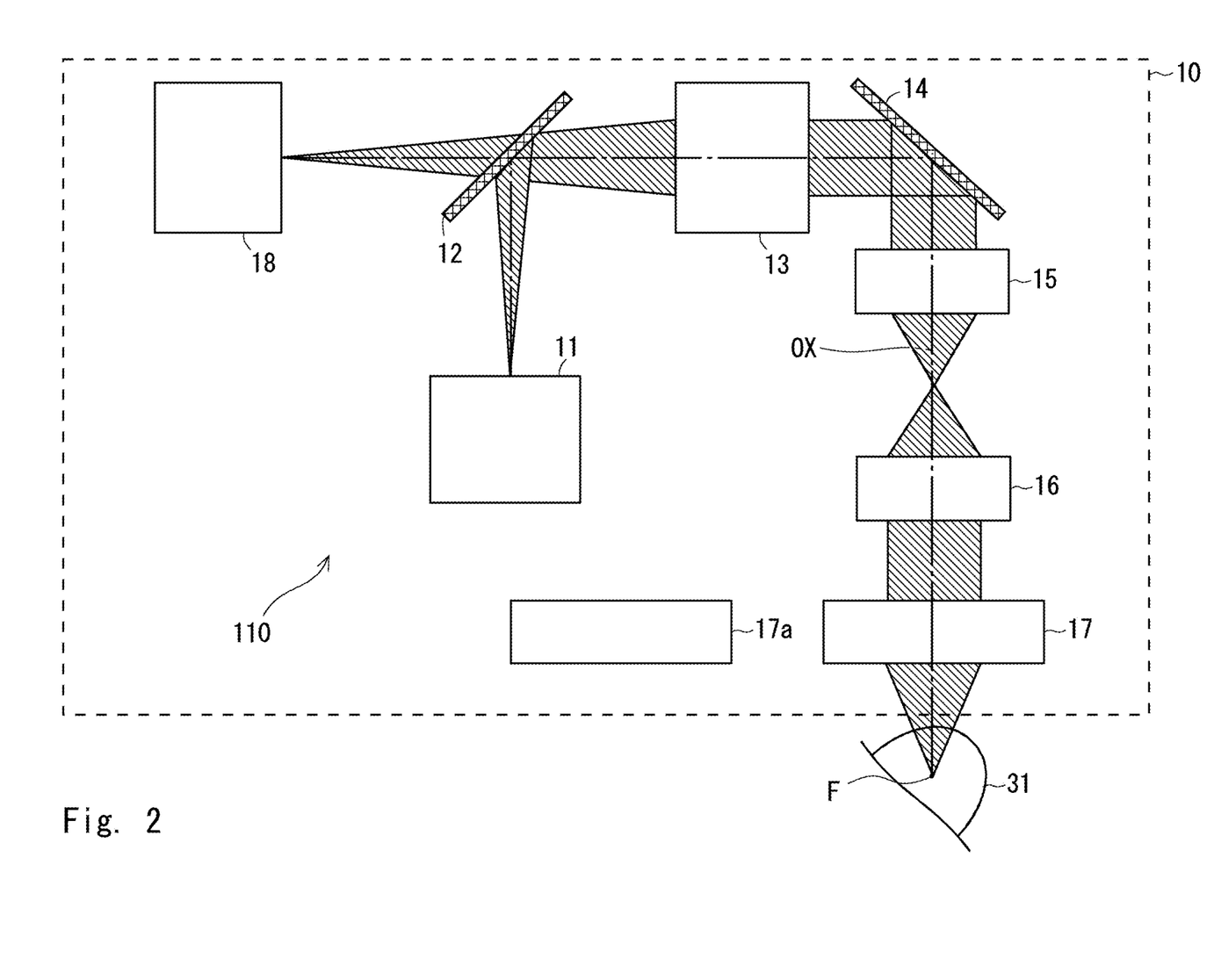
FIG. 2 shows an optical system disposed in an optical head.

Next, a configuration of the optical head 10 is described with reference to FIG. 2. FIG. 2 shows a configuration of an optical system provided in the optical head 10. As described above, the optical head 10 is equipped with the line confocal optical system 110. The line confocal optical system 110 includes an illumination light source 11, a half mirror 12, a lens 13, a scanner 14, a lens 15, a lens 16, an objective lens 17, and a detector 18. These optical devices are fixed to a housing or the like (not shown) in the optical head 10.

Firstly, the illumination light optical system for illuminating the substrate 30 is described. The illumination light source 11 generates linear illumination light. Various types of light sources such as a lamp light source, an LED (Light Emitting Diode), and a laser light source can be used for the illumination light source 11. The illumination light source 11 is a line-light source. Alternatively, it is possible to generate linear illumination light by using a slit or a cylindrical lens.

In order to form the line confocal optical system 110, the illumination light forms a linear illumination area on a focal plane (or a focus plane) of the objective lens 17. Note that the focal plane is a plane that includes the focal point F and is perpendicular to the optical axis OX. On the focal plane, the long-side direction of the illumination area is defined as a Y-direction and the short-side direction thereof is defined as an X-direction. The X- and Y-directions are perpendicular to each other. Needless to say, an ordinary confocal optical system other than the line confocal optical system 110 may be used. In this case, a point light source such as a laser light source or an LED light source is preferably used. Alternatively, a combination of a lamp light source and a pinhole may be used as the point light source.

The illumination light emitted from the illumination light source 11 is incident on the half mirror 12. Half of the light incident on the half mirror 12 passes through the half mirror 12 and the remaining half thereof is reflected on the half mirror 12. The illumination light reflected on the half mirror 12 becomes a parallel luminous flux by the lens 13. The illumination light, which has become the parallel luminous flux, is incident on the scanner 14. The scanner 14 is a galvanometer mirror or the like and deflects the illumination light. The scanner 14 scans (i.e., continuously or successively moves) the illumination light having the linear shape along the Y-direction in the X-direction. As a result, since the illumination light illuminates a 2D area, it is possible to take a 2D confocal image. Note that in the case of the ordinary confocal optical system other than the line confocal optical system 110, the scanner 14 is a 2D scanner that scans the illumination light in the XY-directions.

The illumination light reflected by the scanner 14 is incident on the lens 15. The illumination light is refracted by the lenses 15 and 16. The lenses 15 and 16 are, for example, relay lenses. The illumination light that has passed through the lens 16 becomes a parallel luminous flux.

The illumination light that has passed through the lens 16 is incident on the objective lens 17. The objective lens 17 concentrates the illumination light on the focal plane. The focal point of the objective lens 17 is referred to as a focal point F. As described above, the illumination light concentrated by the objective lens 17 forms a linear illuminated area. The illumination light is reflected on a surface of the substrate 30.

Next, a detection optical system for detecting a reflected light reflected on the substrate 30 is described. The reflected light reflected on the substrate 30 goes back the optical path of the illumination light. That is, the reflected light becomes a parallel luminous flux by the objective lens 17 and is incident on the lens 16. The lenses 16 and 15 refract the reflected light. The reflected light that has passed through the lens 15 is descanned by the scanner 14. The reflected light reflected by the scanner 14 is incident on the lens 13. Then, the reflected light is refracted by the lens 13 and is incident on the half mirror 12. Half of the reflected light from the lens 13 passes through the half mirror 12 and enters the detector 18.

The lens 13 is an imaging lens and concentrates the reflected light on a light receiving surface of the detector 18. The detector 18 is, for example, a line sensor including a plurality of pixels. Specifically, a line CCD (Charged Coupled Device) or a CMOS (Complementary Metal Oxide Semiconductor) line sensor can be used as the detector 18. Therefore, a plurality of pixels are arranged in a row on the light receiving surface of the detector 18. The plurality of pixels of the detector 18 are arranged along the Y-direction. The detector 18 detects the reflected light and outputs data on a detection result to the processing unit 50 (see FIG. 1). That is, the detector 18 outputs, for each pixel, detection data indicating the amount of the detected light to the processing unit 50.

Note that the light receiving surface of the detector 18 is positioned in a place conjugate with the focal plane of the objective lens 17. The illumination light concentrated by the objective lens 17 forms a linear illumination area on the focal plane. On the light receiving surface of the detector 18, the reflected light is concentrated into a linear shape whose longitudinal direction is parallel to the Y-direction. The reflected light that has been reflected on a plane that is deviated from the focal plane in the optical-axis direction is incident on an area outside the pixels of the detector 18. In this way, the line confocal optical system 110 can be formed.

In the above-described example, the detector 18, which is the line sensor, is disposed in a place conjugate with the focal plane of the objective lens 17. However, it is also possible to form the line confocal optical system 110 by using a slit. For example, a slit that is formed along the linear illumination area is positioned at a place conjugate with the focal plane. The detector 18 is disposed behind the slit so as to detect reflected light that has passed through the slit. Here, it is assumed that the detector 18 is a line sensor in which a plurality of pixels are arranged along the direction of the slit. In this way, the reflected light reflected on the focal plane passes through the slit and the reflected light reflected on the plane deviated from the focal plane is shielded by the slit. In this way, the line confocal optical system 110 can be formed. The detector 18 detects the reflected light through the line confocal optical system 110 and outputs detection data to the processing unit 50.

Figure 3:
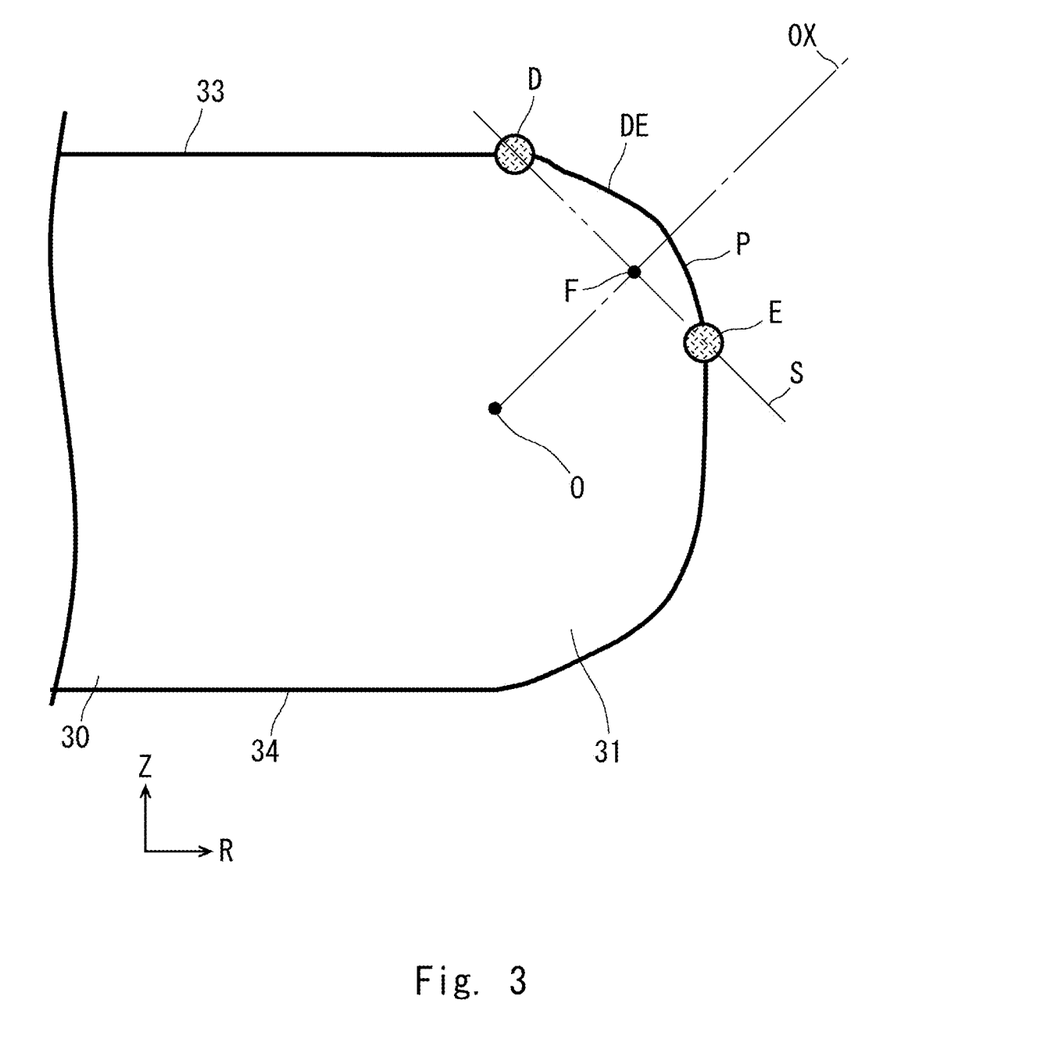
FIG. 3 is a cross section schematically showing an edge part of a substrate.

The illuminated area on which the light is concentrated by the objective lens 17 will be described with reference to FIG. 3. FIG. 3 is an RZ-cross section of the edge part 31 of the substrate 30 and schematically shows an edge profile P of the edge part 31 on the RZ-plane. The Y-direction, which is the longitudinal direction of the linear illuminated area, is a direction on the RZ plane shown in FIG. 3. Further, the X-direction, which is the scanning direction of the scanner 14, is a direction perpendicular to the drawing surface (i.e., the surface of the paper) in FIG. 3.

The optical axis OX is inclined from the Z- and R-directions of the substrate 30. The focal point F is located on the optical axis OX of the objective lens 17 (not shown in FIG. 3). Note that the focal point F is located inside the substrate 30. A plane that passes through the focal point F and perpendicular to the optical axis OX is a focal plane S. The focal plane S is a plane inclined from the R-direction and the Z-direction. As described above, on the focal plane S, the objective lens 17 condenses the illumination light so that the illumination light has a linear shape along the Y-direction.

On the RZ-plane, two points at which the focal plane S cuts across the edge profile P are referred to as edge positions D and E. On the RZ-plane, the edge positions D and E are intersection points between the edge profile P and the focal plane S. Since the line confocal optical system 110 is used, the amount of the detected light of the reflected light reflected at the edge positions D and E increases. Meanwhile, in a range DE between the edge positions D and E, since the edge profile P is deviated from the focal plane S, the amount of the detected light of the reflected light decreases. That is, while the amount of the detected light increases in pixels corresponding to the edge positions D and E, it decreases in pixels corresponding to the range DE.

Here, FIG. 2 is referred to again. The optical head 10 includes an objective lens 17a. The objective lens 17a has a magnification lower than that of the objective lens 17. It is possible to take an image with a wide field of view by using the objective lens 17a. For example, the objective lenses 17 and 17a are attached to a revolver or the like (not shown). The objective lenses 17a and 17 are selectively inserted on the optical path. That is, one of the objective lenses 17 and 17a is inserted on the optical path and the other objective lens is removed from the optical path.

The objective lens 17a is used to acquire rough-shape data indicating a rough shape of the substrate 30. For example, in the case where an image of a notch part of a semiconductor wafer is taken, the objective lens 17a has such a low magnification that the notch part can be entirely observed in one field of view. The field of view of the objective lens 17a is, for example, 4 mm or larger. After acquiring the rough-shape data of the substrate 30 by using the objective lens 17a, a confocal image is taken by using the objective lens 17. The objective lens 17 has a higher magnification and a higher NA than those of the objective lens 17a. The field of view of the objective lens 17 is about 800 μm, which is narrower than that of the objective lens 17a.

Figure 4:
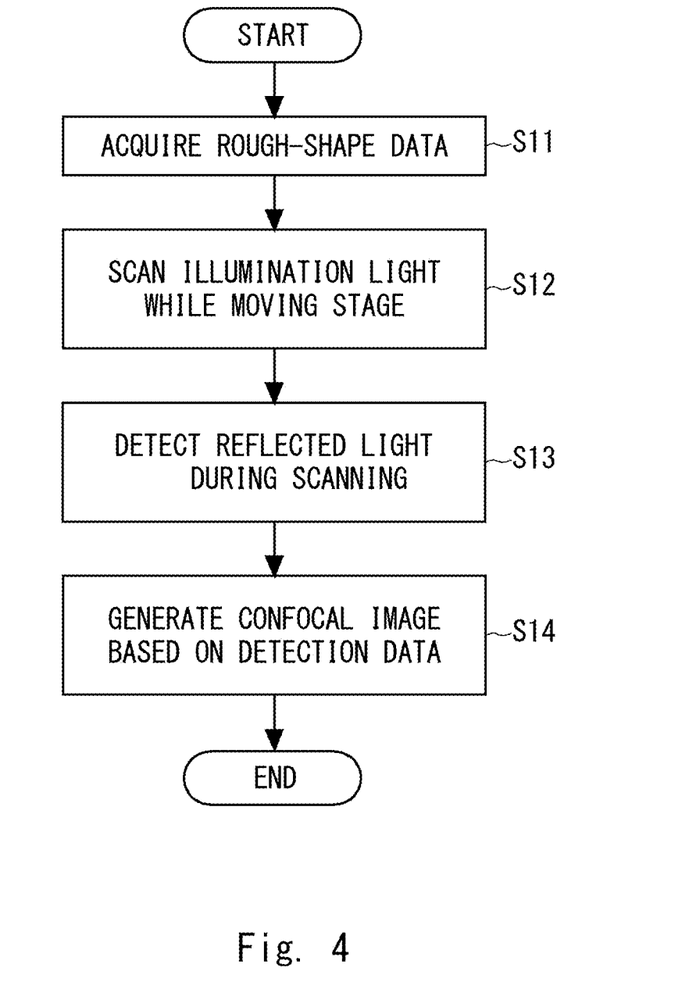
FIG. 4 is a flowchart showing a method for taking a confocal image.

Next, a method for taking an image by using the confocal microscope 100 will be described with reference to FIG. 4. FIG. 4 is a flowchart showing a method for taking a confocal image.

Firstly, the data acquisition unit 52 acquires rough-shape data indicating a rough shape of the notch part (S11). In a step S11, the confocal microscope 100 measures the rough shape by using the objective lens 17a. That is, in the optical head 10, the objective lens 17 is removed from the optical path and the objective lens 17a is inserted in the optical path. Since the objective lens 17a has a low magnification, an image of the entire notch part can be taken in one field of view. Since the line confocal optical system 110 is used, the detector 18 detects reflected light reflected on the focal plane.

The scanner 14 scans (i.e., continuously or successively moves) the illumination light in the X-direction. Further, the objective lens 17a is moved in the direction of the optical axis OX in a stepwise manner. By doing so, the distance from the edge of the substrate 30 to the objective lens 17a can be changed. The detector 18 detects the reflected light reflected on the substrate 30 through the objective lens 17a. In the line confocal optical system 110, when the edge of the substrate 30 is located on the focal plane, the amount of detected light increases in pixels that receive the reflected light from the edge. The processing device 50 can measure the rough shape by connecting points at which the amount of detected light is large with one another. Further, it is possible to three-dimensionally measure the rough shape of the edge part 31 by moving the objective lens 17a in the direction of the optical axis OX in a stepwise manner. The acquisition accuracy of the rough shape in the step S11 may be lower than the image-taking accuracy of the confocal image that will be acquired in the next step S12. The data acquisition unit 52 stores the rough-shape data indicating the rough shape in a memory or the like. Note that the rough-shape data may be acquired by moving the stage 20 along the optical axis OX instead of moving the objective lens 17a.

Next, the scanner 14 scans the illumination light while the control unit 51 moves the stage 20 along the rough shape (S12). In the step S12, in the optical head 10, the objective lens 17a is removed from the optical path and the objective lens 17 is inserted in the optical path. The control unit 51 controls the stage 20 based on the rough-shape data. The illuminated place is scanned (i.e., continuously or successively moved) along the rough shape of the sample as the stage 20 changes the position of the objective lens 17 relative to the substrate 30. Therefore, the field of view of the objective lens 17 on the substrate 30 is scanned (i.e., continuously or successively moved). The control unit 51 continuously moves the stage 20 along the rough shape.

The position of the objective lens 17 relative to the substrate 30 is scanned (i.e., continuously or successively moved) in the R-direction and the-θ direction. The direction of the scanning by the stage 20 has a component parallel to the R-direction and a component parallel to the θ direction. In this way, it is possible to make the path of the scanning by the stage 20 parallel to the rough shape. Further, the scanner 14 scans (i.e., continuously or successively moves) the illumination light in the X-direction during the scanning by the stage 20. The scanning speed of the scanner 14 is sufficiently higher than the scanning speed of the stage 20.

The detector 18 detects reflected light reflected by the substrate 30 during the scanning of the stage 20 and the scanner 14 (S13). Then, the detector 18 outputs detection data of the reflected light to the processing device 50. The processing device 50 stores coordinate data of the stage 20 and the position in the X-direction of the scanning by the scanner 14 while associating them with the detection data. Specifically, the processing device 50 associates, for each frame of the detector 18, the coordinate data of the stage 20 and the position in the X-direction of the scanning by the scanner 14 with the detection data.

The image generation unit 53 generates a confocal image based on the detection data (S14). The image generation unit 53 determines (e.g., calculates) the position of the focal plane in the substrate 30 based on the coordinate data. Further, the image generation unit 53 determines (e.g., calculates) the position of the illuminated area in the focal plane based on the scanning position in the X-direction. The image generation unit 53 can determine, for each frame, from where on the substrate 30 each pixel of the detector 18 receives reflected light. Note that the steps S12 to S14 may be performed in parallel to each other.

In this way, the processing device 50 can obtain a 3D brightness distribution. The confocal microscope 100 can take a 3D confocal image of the edge part 31. It is possible to take an image of the edge part 31 of the substrate 30 with high accuracy by using the objective lens 17 having a high NA and a high magnification. Further, the confocal image can be taken in a short time by moving the substrate 30 along the rough shape.

Figure 5:
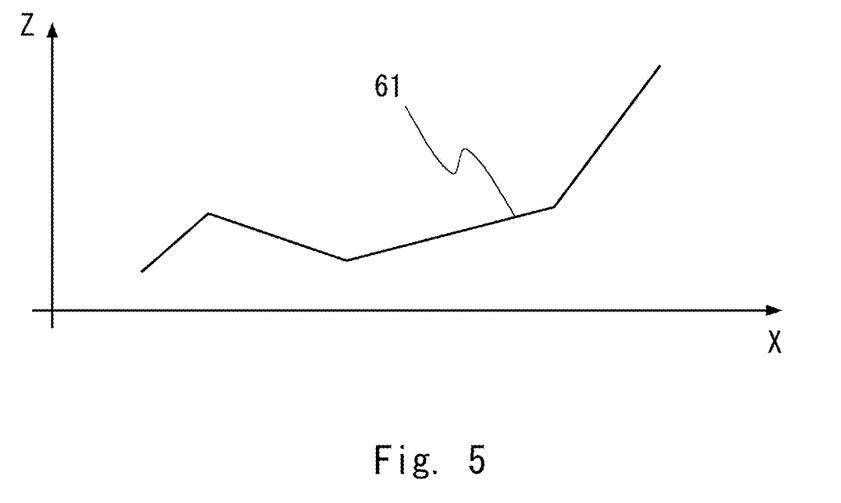
FIG. 5 shows an acquired rough shape.
Figure 6:
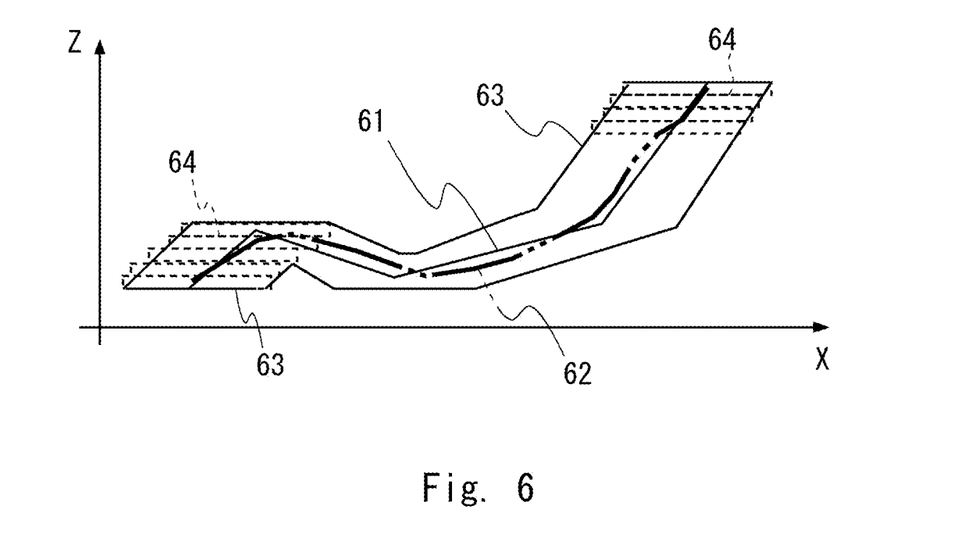
FIG. 6 is a diagram for explaining an image-taking range of the field of view when a stage is scanned along a rough shape.

The step S12 will be described in detail. FIG. 5 is an XZ-plane view schematically showing the rough shape 61 of the edge part 31 measured in the step S11. FIG. 6 is a diagram for explaining an image-taking range when the stage 20 scans (i.e., moves) the substrate 30 along the rough shape 61. The scanning range 64 is a range indicating one scanning by the scanner 14 and corresponds to the field of view of the objective lens 17. The image-taking range 63 corresponds to the scanning range of the stage 20 and the scanner 14. That is, the image-taking range 63 is a range in which reflected light can be detected when the stage 20 is moved while the scanner 14 performs scanning. In FIG. 6, the actual shape of the edge part 31 is indicated by an actual shape 62.

The stage 20 is controlled so that the contour of the rough shape 61 is positioned on the center of the scanning range 64 in the X-direction. The scanner 14 deflects the illumination light in both the X-axis positive and negative directions while using the contour of the rough shape 61 as the center of the deflection. One end of the scanning range 64 is located on the X-axis positive side of the rough shape 61 and the other end thereof is located on the X-axis negative side of the rough shape 61. As shown in FIG. 6, even if there is an error between the actual shape 62 and the rough shape 61, the actual shape 62 is included (i.e., contained) in the image-taking range 63. The actual shape 62 is illuminated even if the rough shape 61 is deviated from the actual shape 62. Even when the measurement accuracy of the rough shape 61 is not high, the edge position of the substrate 30 is included in the field of view of the objective lens 17. In other words, the measurement of the rough shape 61 has a margin (i.e., a tolerance) equivalent to the size of the field of view.

The Illumination light scanned (i.e., continuously or successively moved) by the scanner 14 illuminates the edge position of the substrate 30 (see FIG. 3). As a result, it is possible to illuminate an area including the edge position of the substrate 30 and thereby to take a confocal image of the edge part 31. Further, since the stage 20 is scanned (i.e., moved) along the rough shape 61, the scanning range of the stage 20 can be reduced. Since the illuminated place is three-dimensionally scanned (i.e., three-dimensionally moved) along the rough shape 61, the time taken for taking the image can be reduced.

The direction of the scanning by the stage 20 has a component parallel to the direction of the scanning by the scanner 14. That is, the direction of the scanning by the stage 20 is inclined from the X-direction, which is the direction of the scanning by the scanner, and is also inclined from the optical axis OX. Therefore, the 3D scanning range by the stage 20 and the scanner 14 has a shape that is inclined from the direction of the optical axis. Therefore, even when an image of a curved edge part 31 of the substrate 30 is taken, the image can be taken in a short time. Further, in the case where the moving direction of the stage 20 does not change, it is possible to prevent seams from being formed which would otherwise be caused due to distortion or shading.

In contrast, in an ordinary confocal microscope, the stage or the objective lens is moved in the direction of the optical axis. Therefore, the 3D scanning range has a rectangular-parallelepiped shape extending along the direction of the optical axis. When an image of a curved edge part 31 is taken, the time taken for taking the image increases. Further, in an ordinary confocal microscope, it is necessary to compensate for shading and distortion in the optical system.

Figure 7:
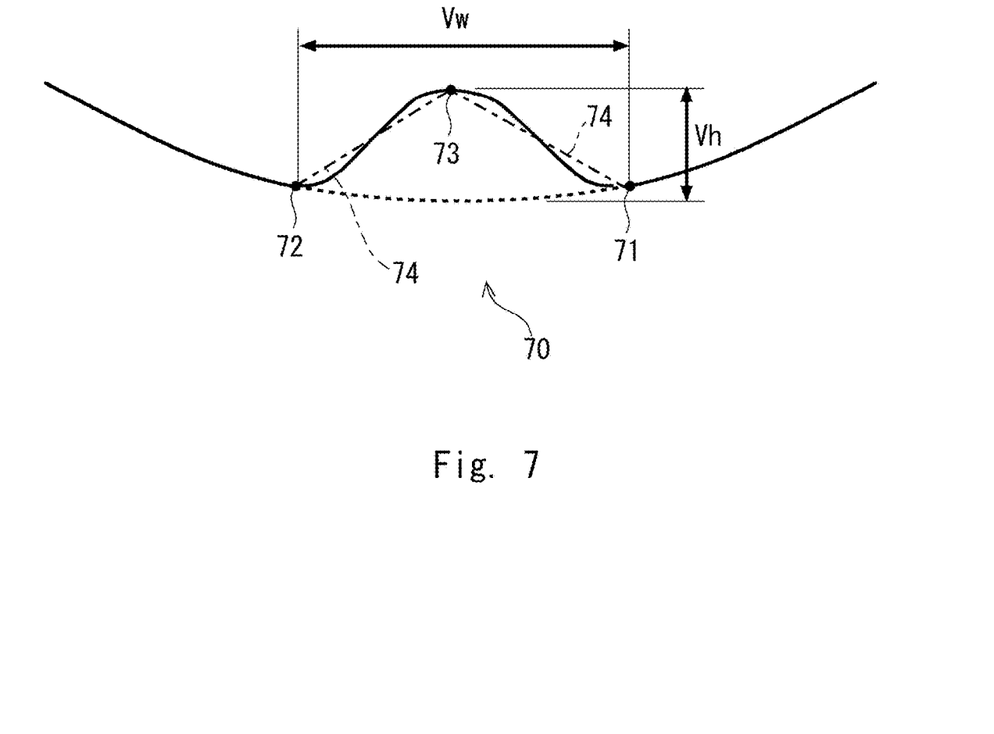
FIG. 7 is a top view schematically illustrating a notch of a wafer.

FIG. 7 is a plan view showing a notch 70 formed in an edge part of a semiconductor wafer. For example, in the case of a semiconductor wafer having a diameter of 300 mm, a depth Vh of the notch 70 is about 1.25 mm and a width Vw thereof is about 4 mm. Points at both ends of the notch 70 are referred to as end points 71 and 72, and a middle point between the end points 71 and 72 is referred to as a middle point 73.

Since the objective lens 17a for measuring a rough shape has a low magnification, the notch 70 is entirely included in the field of view. When the objective lens 17a has a low NA, places that are widely inclined from the optical axis may not be accurately measured. For example, in the notch 70, only the positions of the end points 71 and 72 and the middle point 73 may be measured. In this case, it is possible to define a straight-line segment 74 connecting the end point 71 with the middle point 73 and a straight-line segment 74 connecting the middle point 73 and the end point 72 as a contour of a rough shape of the notch. Even when the measurement accuracy of the rough shape is low, the edge position is included in the image-taking range, i.e., the field of view of the objective lens 17, which has a margin (i.e., a tolerance) equivalent to the size of the field of view of the objective lens 17. Therefore, it is possible to take a 3D confocal image of the notch 70.

Figure 8:
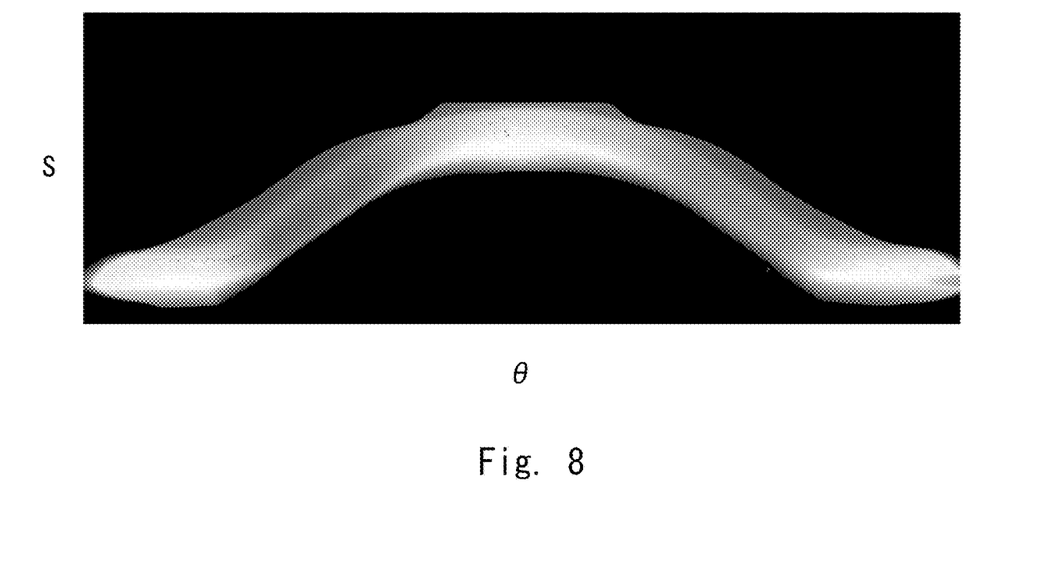
FIG. 8 shows a confocal image of a notch taken by a confocal microscope according to an embodiment.

FIG. 8 shows a confocal image of a notch taken by the confocal microscope 100. In FIG. 8, a plane in a 2D coordinate system in which the horizontal axis represents the θ-direction and the vertical axis represents the focal-point direction (a direction perpendicular to the optical axes OX and the θ-direction) is converted into that in an orthogonal coordinate system. It is possible to take a confocal image with high accuracy by the method for taking an image by using the confocal microscope 100. It is possible to take an image of an area larger than the field of view of the objective lens 17 all at once.

By taking an image of the notch part with a high resolution, it is possible to detect cracks and chipping that occur in or near the notch part of the semiconductor wafer. In this way, it is possible to improve the productivity of semiconductor devices. For example, in a semiconductor manufacturing process, a notch comes into contact with an alignment pin or the like disposed in a semiconductor manufacturing apparatus. If there is a crack in the notch, the semiconductor wafer may be damaged by the contact between the notch and the alignment pin. When the semiconductor wafer is damaged, it takes time to restore the semiconductor manufacturing apparatus. By using the confocal microscope according to this embodiment, an image of the notch can be taken in a short time, thus making it possible to detect a crack in the notch in advance. A semiconductor wafer in which a crack occurred in the notch can be eliminated as a defective product. As a result, it is possible to improve the productivity of semiconductor devices.

The method for acquiring rough-shape data is not limited to the method using the objective lens 17a having a low magnification. For example, a rough shape of a substrate 30 may be measured by a transmission image (e.g., fluoroscopic image) that is obtained by taking an image of the substrate 30 with a transmission-type image-taking optical system. Specifically, the optical head 10 is moved to a position directly above the substrate 30 by rotationally driving the optical head 10 around the A-axis. The edge part 31 is illuminated by an illumination light source 11 disposed below the substrate 30. A transmission image of the edge part 31 of the substrate 30 is taken by a CCD camera disposed in the optical head, which has been moved to the position above the substrate 30. In this way, it is possible to take the transmission image of the edge part 31 of the substrate 30. Then, the processing device 50 acquires rough-shape data based on the transmission image. Alternatively, rough-shape data may be obtained from design data. For example, if there is design data indicating a shape of a notch as shown in FIG. 7, the design data may be acquired (i.e., used) as rough-shape data.

Note that in the above description, the stage 20 is driven in order to change the position of the objective lens 17 relative to the substrate 30. However, the optical head 10 may be moved instead of moving the stage 20. That is, the position of the objective lens 17 relative to the substrate 30 may be changed by moving the optical head 10. Further, the position of the objective lens 17 relative to the substrate 30 may be changed by driving both the optical head 10 and the stage 20. That is, the relative positions of the sample and the objective lens can be changed by moving at least one of the optical head 10 and the stage 20. It is possible to scan (i.e., continuously or successively move) the illuminated place along the rough shape by moving at least one of the optical head 10 and the stage 20.

Some or all of the above-described processes performed by the processing device 50 may be performed by a computer program. The above-described program can be stored in various types of non-transitory computer readable media and thereby supplied to the computer. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to the computer by using various types of transitory computer readable media. Examples of the transitory computer readable media include an electrical signal, an optical signal, and an electromagnetic wave. The transitory computer readable media can be used to supply programs to the computer through a wire communication path such as an electrical wire and an optical fiber, or wireless communication path.

Although the embodiments according to the present disclosure have been explained above, the present disclosure also includes various modifications that do not substantially impair the purposes and the advantages of the present disclosure. Further, the above-described embodiments should not be used to limit the scope of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:
1. A confocal microscope comprising:
 a data acquisition unit configured to acquire a rough-shape data indicating a rough shape of an edge part of a sample;

an illumination light source configured to generate illumination light for illuminating the edge part of the sample;
a first objective lens configured to concentrate the illumination light on the sample, wherein an optical axis of the first objective lens is inclined from an upper surface of the sample;
wherein the rough-shape data is acquired by using a second objective lens having a magnification lower than that of the first objective lens,
an optical scanner configured to scan an illuminated place on the edge part of the sample in a field of view of the first objective lens;
a scanning mechanism configured to scan the illuminated place along the rough shape of the sample by changing a position of the first objective lens relative to the sample in a direction inclined from the optical axis of the first objective lens; and
an optical detector configured to detect reflected light through a confocal optical system, the reflected light being light that has been reflected on the edge part of the sample and has passed through the first objective lens.

2. The confocal microscope according to claim 1, wherein a direction of the scanning performed by the scanning mechanism has a component parallel to a direction of the scanning performed by the optical scanner.

3. The confocal microscope according to claim 1, wherein the scanning mechanism continuously scans the illuminated place along the rough shape of the sample.

4. The confocal microscope according to claim 1, wherein
the sample is a semiconductor wafer with a notch part formed therein,
the rough-shape data indicates a rough shape of the notch part of the semiconductor wafer, and
the confocal microscope takes an image of the notch part of the semiconductor wafer.

5. The confocal microscope according to claim 4, wherein the second objective lens is configured so that the notch part can be observed in one field of view.

6. The confocal microscope according to claim 1, wherein the scanning mechanism comprises a movable stage on which the sample is placed.

7. A method for taking an image by using a confocal microscope configured to concentrate illumination light on an edge part of a sample by using a first objective lens, wherein the first objective lens is disposed so that an optical axis of the first objective lens is inclined from an upper surface of the sample, and to detect reflected light reflected on the sample through a confocal optical system, the method comprising:
acquiring, by using a second objective lens having a magnification lower than that of the first objective lens, a rough-shape data indicating a rough shape of an edge part of the sample;
scanning, by a scanning mechanism, an illuminated place along the rough shape of the edge part of the sample by changing a position of the first objective lens relative to the sample in a direction inclined from the optical axis of the first objective lens, and scanning, by an optical scanner, the illuminated place on the edge part within a field of view of the first objective lens;
detecting, by a detector, the reflected light reflected on the sample during the scanning by the scanning mechanism and the optical scanner; and
generating a confocal image based on detection data detected by the detector.

8. The method for taking an image according to claim 7, wherein a direction of the scanning performed by the scanning mechanism has a component parallel to a direction of the scanning performed by the optical scanner.

9. The method for taking an image according to claim 7, wherein the scanning mechanism continuously scans the illuminated place along the rough shape of the sample.

10. The method for taking an image according to claim 7, wherein
the sample is a semiconductor wafer with a notch part formed therein,
the rough-shape data indicates a rough shape of the notch part of the semiconductor wafer, and
the confocal microscope takes an image of the notch part of the semiconductor wafer.

11. The method for taking an image according to claim 10, wherein the second objective lens being configured so that the notch part can be observed in one field of view.

12. The method for taking an image according to claim 7, wherein the scanning mechanism includes a movable stage on which the sample is placed.

* * * * *